(12) United States Patent
Klasen-Memmer et al.

(10) Patent No.: US 6,929,834 B2
(45) Date of Patent: Aug. 16, 2005

(54) LIQUID CRYSTALLINE MEDIUM

(75) Inventors: Melaine Klasen-Memmer, Heuchelheim (DE); Clarissa Weller, Darmstadt (DE); Matthias Bremer, Darmstadt (DE); Detlef Pauluth, Ober-Ramstadt (DE); Hans-Rolf Duebal, Eltville (DE); Barbara Hornung, Hasselroth (DE); Wolfgang Schmidt, Dreieich (DE); Rainer Wingen, Hofheim (DE)

(73) Assignee: Merck Patent GmbH, Darmstadt (DE)

( * ) Notice: Subject to any disclaimer, the term of this patent is extended or adjusted under 35 U.S.C. 154(b) by 32 days.

(21) Appl. No.: 10/451,341

(22) PCT Filed: Sep. 25, 2001

(86) PCT No.: PCT/EP01/11089
§ 371 (c)(1),
(2), (4) Date: Dec. 8, 2003

(87) PCT Pub. No.: WO02/051963
PCT Pub. Date: Jul. 4, 2002

(65) Prior Publication Data
US 2004/0099842 A1 May 27, 2004

(30) Foreign Application Priority Data
Dec. 23, 2000 (DE) .......................................... 100 64 995

(51) Int. Cl.$^7$ ........................ C09K 19/32; C09K 19/30; C09K 19/34; C09K 19/12
(52) U.S. Cl. .............. 428/1.1; 252/299.62; 252/299.61; 252/299.63; 252/299.66
(58) Field of Search ...................... 428/1.1; 252/299.61, 252/299.62, 299.63, 299.66

(56) References Cited

U.S. PATENT DOCUMENTS

| 5,648,021 A | 7/1997 | Wingen et al. |
| 5,888,422 A | 3/1999 | Manero et al. |
| 6,171,519 B1 | 1/2001 | Nonaka et al. |
| 6,280,653 B1 * | 8/2001 | Jones et al. ............ 252/299.61 |

FOREIGN PATENT DOCUMENTS

| DE | 19500768 | 9/1995 |
| DE | 19524230 | 1/1997 |
| WO | WO 9704039 | 2/1997 |

* cited by examiner

Primary Examiner—Shean C. Wu
(74) Attorney, Agent, or Firm—Millen White Zelano & Branigan, P.C.

(57) ABSTRACT

The invention relates to a liquid-crystalline medium based on a mixture of polar compounds of negative dielectric anisotropy which comprises at least one compound of the formula I

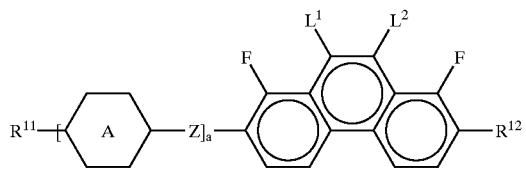

in which $R^{11}$ and $R^{12}$, ring A, Z, a, $L^1$ and $L^2$ are as defined in claim 1, and the use thereof for an active-matrix display based on the ECB effect.

13 Claims, No Drawings

LIQUID CRYSTALLINE MEDIUM

The invention relates to a liquid-crystalline medium based on a mixture of polar compounds of negative dielectric anisotropy which comprises at least one compound of the formula I

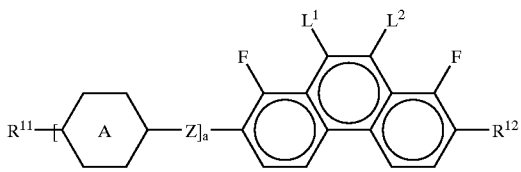

in which
$R^{11}$ and $R^{12}$ are each, independently of one another, an alkyl or alkenyl radical having up to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

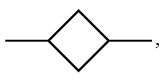

—C≡C—, —CO—, —CO—O—, —O—CO— or —O—CO—O— in such a way that O atoms are not linked directly to one another,
$L^1$ and $L^2$ are each, independently of one another, H or F,

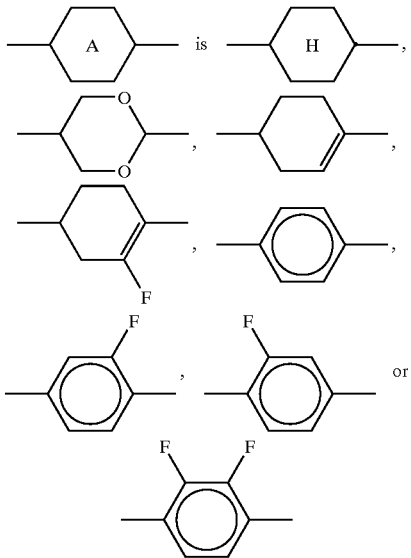

Z is —CF$_2$O—, —OCF$_2$—, —C≡C—, —CF=CF—, —C$_2$F$_4$—, —COO—, —OCO—, —CH$_2$O—, —OCH$_2$— or a single bond,
a is 0 or 1.

Media of this type are to be used, in particular, for electro-optical displays having active matrix addressing based on the ECB effect. They can furthermore be employed for IPS (in plane switching) modes in which dielectrically negative liquid-crystal mixtures are used, and for ASM (axially symmetric microdomain) displays, and for displays addressed by means of plasma arrays (PALC: plasma addressed liquid crystals).

The principle of electrically controlled birefringence, the ECB (electrically controlled birefringence) effect or DAP (deformation of aligned phases) effect was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy Δn and values for the dielectric anisotropy Δε of from −0.5 to −5 in order to be suitable for use in high-information display elements based on the ECB effect. Electro-optical display elements based on the ECB effect have a homeotropic edge alignment.

Industrial application of this effect in electro-optical display elements requires liquid-crystal (LC) phases which have to satisfy a multiplicity of requirements. Particularly important here are chemical resistance to moisture, air and physical influences, such as heat, radiation in the infrared, visible and ultraviolet region, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of from two to 25, preferably from three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-compatible displays, in which a mosaic of red, green and blue filters is arranged in such a way that a filter element is opposite each switchable pixel.

The TFT displays disclosed hitherto usually operate as TN cells with crossed polarisers in transmission and are lit from the back.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for monitors, TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With increasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantage of the MLC-TN displays disclosed hitherto is due to their comparatively low contrast, the relatively high viewing-angle dependence and the difficulty of producing grey shades in these displays.

EP 0 474 062 discloses MLC displays based on the ECB effect. The LC mixtures described therein are based on 2,3-difluorophenyl derivatives which contain an ester, ether or ethyl bridge and have low values for the "voltage holding ratio" (HR) after exposure to UV.

There thus continues to be a great demand for MLC displays having very high specific resistance at the same time as a wide operating-temperature range, short response times, low rotational viscosities and low threshold voltage with the aid of which various grey shades can be produced.

The invention has the object of providing MLC displays which are based on the ECB effect and do not have the disadvantages indicated above, or only do so to a lesser extent, and at the same time have very high specific resistance values.

It has now been found that this object can be achieved if nematic liquid-crystal mixtures which comprise at least one compound of the formula I are used in these display elements.

The invention thus relates to a liquid-crystalline medium based on a mixture of polar compounds of negative dielectric anisotropy which comprises at least one compound of the formula I. The medium according to the invention preferably comprises compounds of the formula I in which $R^{11}$ and/or $R^{12}$ are alkyl or alkoxy. In particular, $R^{11}$ and $R^{12}$ are alkoxy having from 2 to 7 carbon atoms, and $L^1$ and $L^2$ are preferably H.

Compounds of the formula I are disclosed, for example, in DE-A-195 00 768. The use of these compounds in polar mixtures with $\Delta\varepsilon<0$ is not described in the prior art.

The media according to the invention preferably comprise one or more compounds of the formulae Ia to II

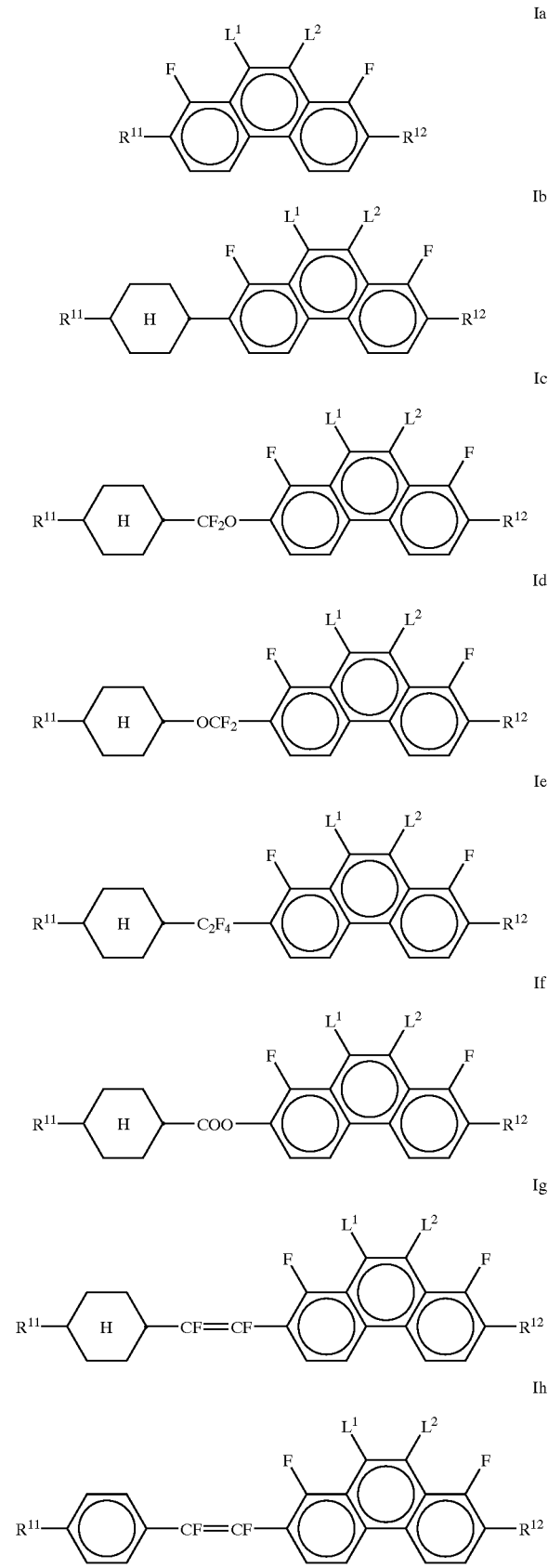

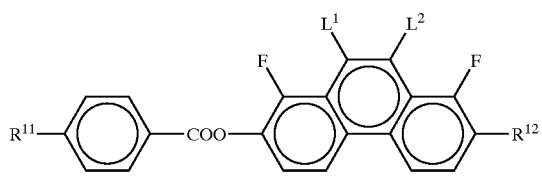

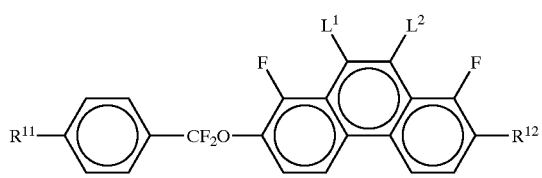

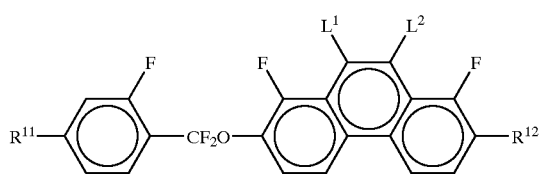

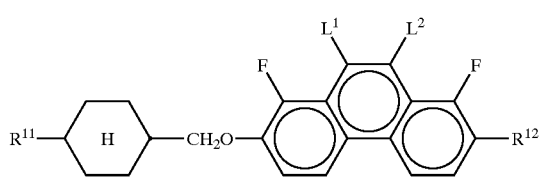

In which $R^{11}$ is as defined above.

The mixture according to the invention exhibits very favourable values for the capacitive threshold, relatively high values for the holding ratio, low rotational viscosities and at the same time very good low-temperature stability.

Some preferred embodiments of the mixtures according to the invention are given below:

a) Medium which additionally comprises one or more compounds of the formula II:

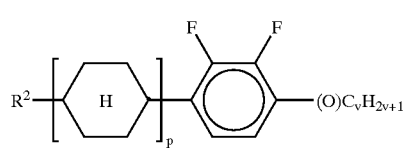

in which
$R^2$ is as defined for $R^{11}$ or $R^{12}$,
p is 1 or 2, and
v is from 1 to 6 b) Medium which additionally comprises one or more compounds of the formula III

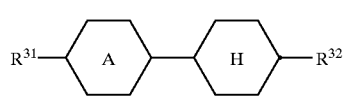

in which
$R^{31}$ and $R^{32}$ are each, independently of one another, a straight-chain alkylalkoxy, alkyl or alkoxy radical having up to 12 carbon atoms, and

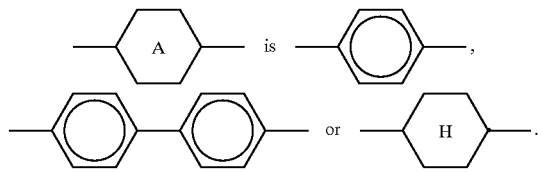

c) Medium which comprises two, three, four or more, preferably two or three, compounds of the formula I.

d) Medium in which the proportion of compounds of the formula I in the mixture as a whole is at least 3% by weight, preferably at least 10% by weight.

e) Medium which comprises at least one compound of the formula IV

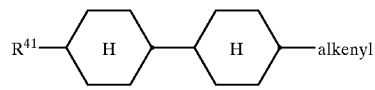

in which
$R^{41}$ is an alkyl or alkenyl radical having up to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

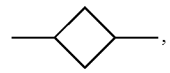

—C≡C—, —CO—, —CO—O—, —O—CO— or —O—CO—O— in such a way that O atoms are not linked directly to one another.

f) Medium in which the proportion of compounds of the formula II in the mixture as a whole is at least 20% by weight.

g) Medium in which the proportion of compounds of the formula III in the mixture as a whole is at least 3% by weight.

h) Medium in which the proportion of compounds of the formula IV in the mixture as a whole is at least 5% by weight, preferably at least 10% by weight.

i) Medium which comprises at least one compound selected from the formulae IVa and/or IVb:

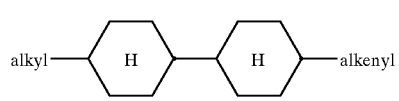

Particular preference is given to the compounds of the formulae IVaa-IVad and IVba-IVbf:

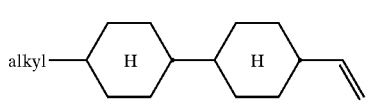

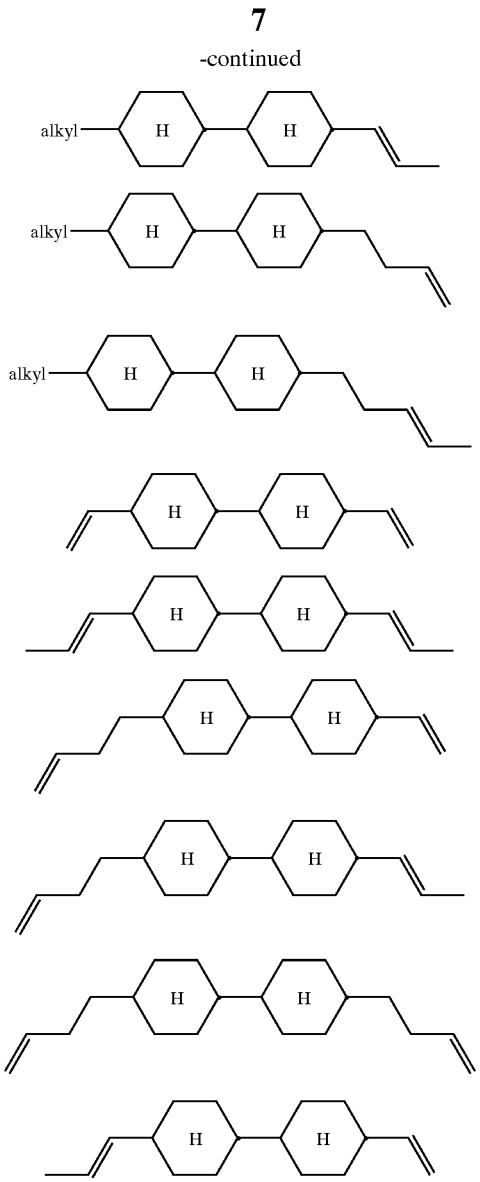

in which
alkenyl and alkenyl* are each, independently of one another, a straight-chain alkenyl radical having 2–6 carbon atoms, and
alkyl is a straight-chain alkyl radical having 1–6 carbon atoms.

j) Medium which additionally comprises a compound selected from the formulae IIIa to IIIe:

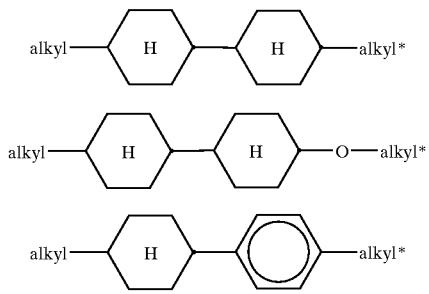

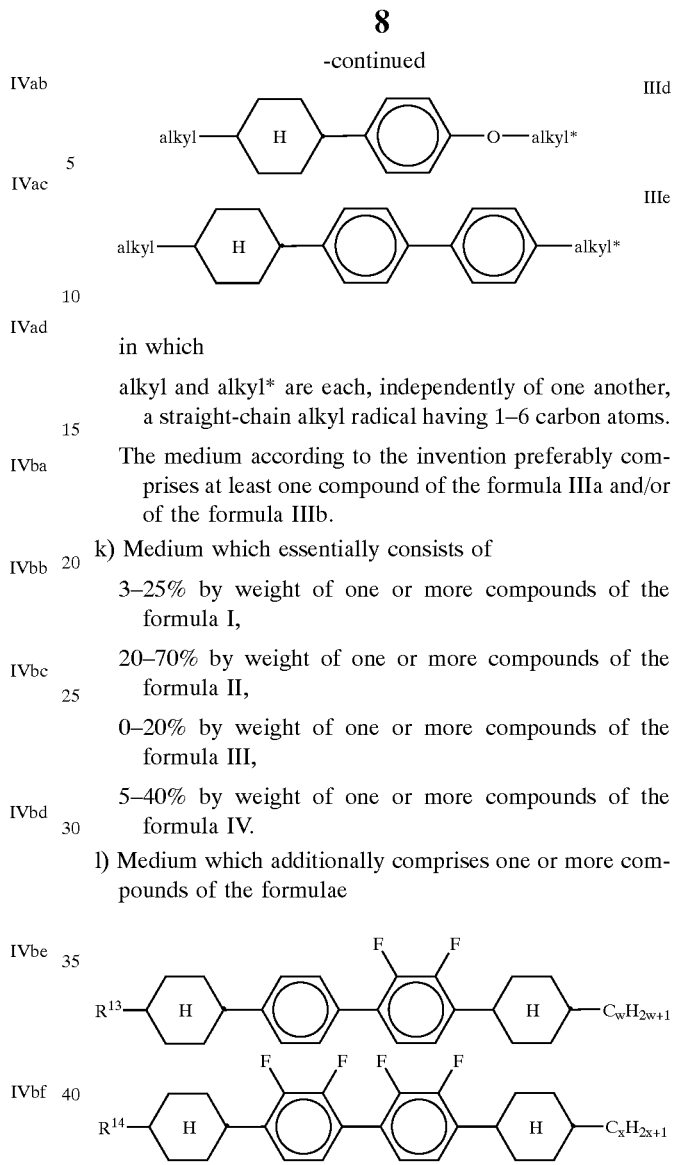

in which
alkyl and alkyl* are each, independently of one another, a straight-chain alkyl radical having 1–6 carbon atoms.

The medium according to the invention preferably comprises at least one compound of the formula IIIa and/or of the formula IIIb.

k) Medium which essentially consists of

3–25% by weight of one or more compounds of the formula I,

20–70% by weight of one or more compounds of the formula II,

0–20% by weight of one or more compounds of the formula III,

5–40% by weight of one or more compounds of the formula IV.

l) Medium which additionally comprises one or more compounds of the formulae

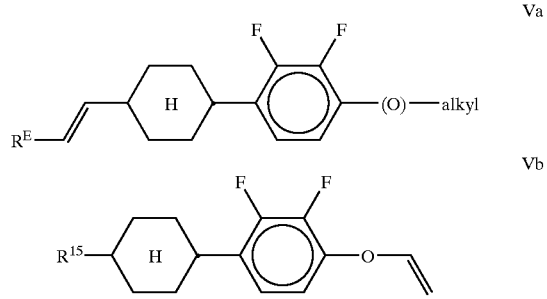

in which
$R^{13}$ and $R^{14}$ are each, independently of one another, as defined for $R^{11}$ and $R^{12}$ in claim 1, and
w and x are each, independently of one another, from 1 to 6.

m) Medium which additionally comprises one or more bicyclic compounds selected from the group consisting of the compounds of the formulae Va to Vg:

-continued

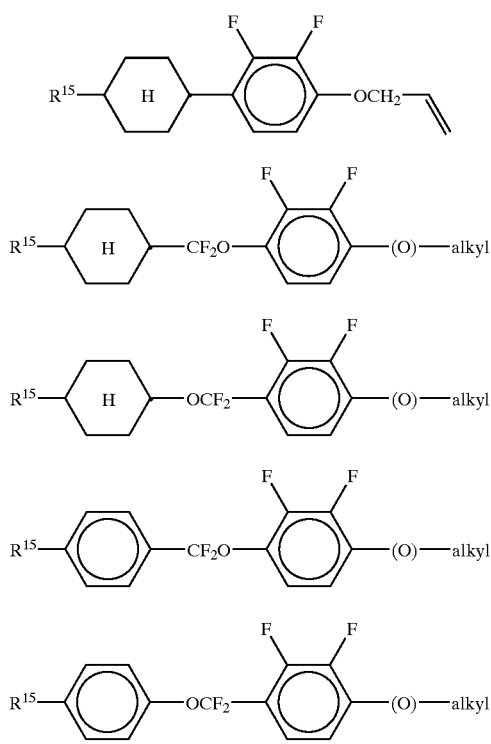

in which

R[15] is an alkyl or alkenyl radical having up to 15 carbon atoms which is unsubstituted, monosubstituted by CN or CF₃ or at least monosubstituted by halogen, where, in addition, one or more CH₂ groups in these radicals may each, independently of one another, be replaced by —O—, —S—,

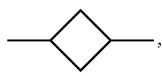

—C≡C—, —CO—, —CO—O—, —O—CO— or —O—CO—O— in such a way that O atoms are not linked directly to one another, and R[E] is H, CH₃, C₂H₅ or n-C₃H₇.

Of the compounds of the formulae Va to Ve, particular preference is given to the compounds of the formulae Va, Vd and Ve.

n) Medium which additionally comprises one or more tricyclic compounds selected from the group consisting of the compounds of the formulae VIa to VIo:

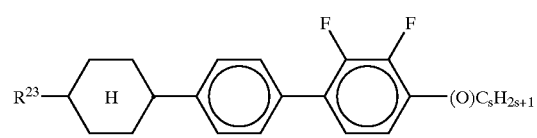

-continued

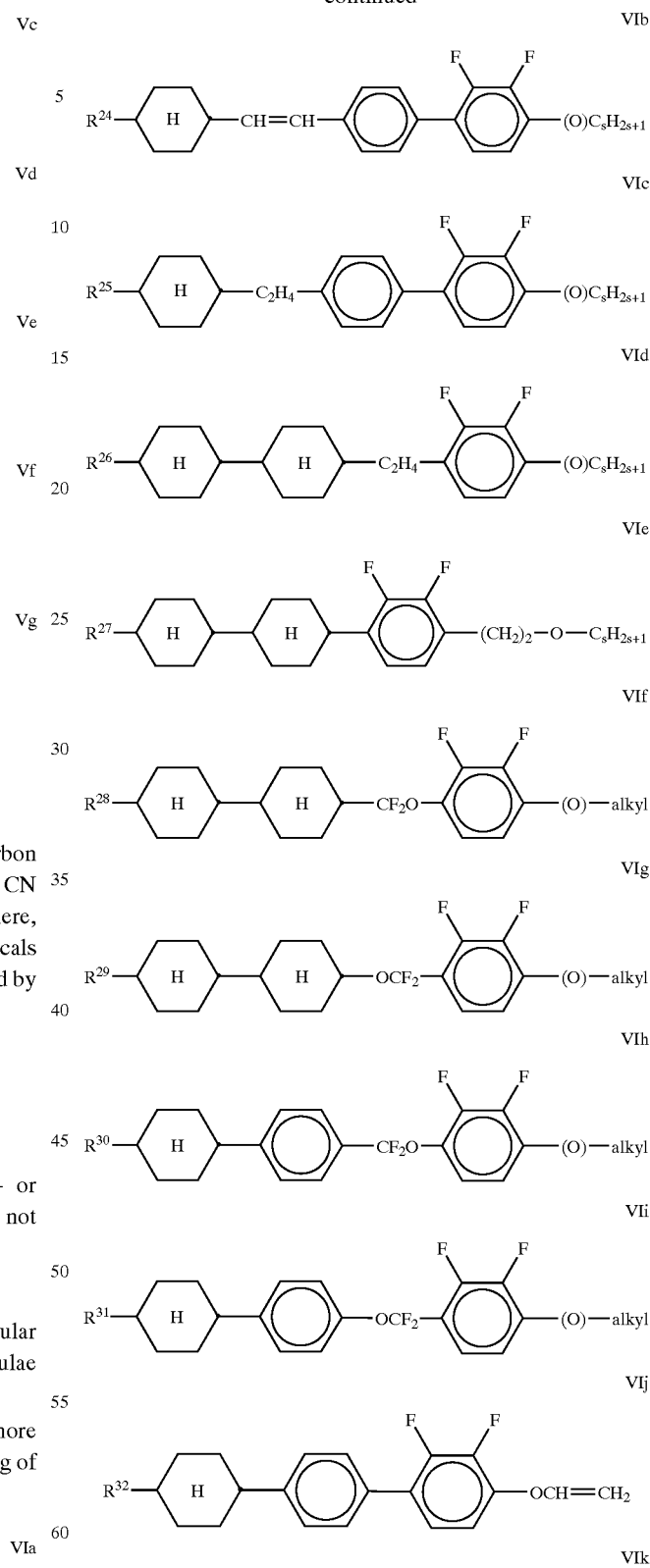

VII

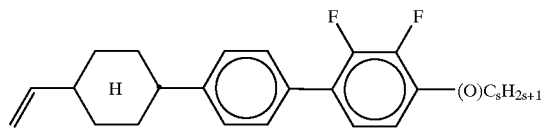

VIm

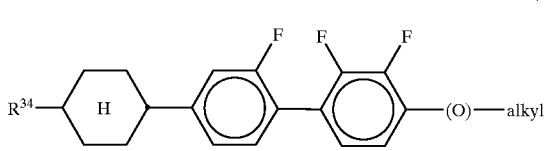

VIn

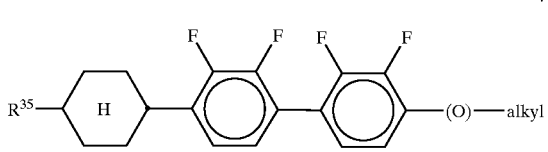

VIo

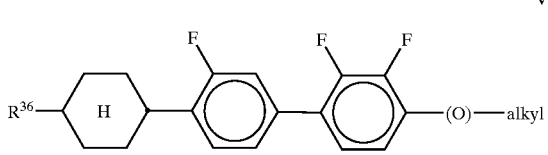

in which
R²³ to R³⁶ are an alkyl or alkenyl radical having up to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

—C≡C—, —CO—, —CO—O—, —O—CO— or —O—CO—O— in such a way that O atoms are not linked directly to one another, and s is from 1 to 6.

Of the said compounds, one or more compounds of the formulae VIa, VId, VIf and/or VIg are preferably employed in the media according to the invention.

o) Medium additionally comprising one or more compounds of the formula

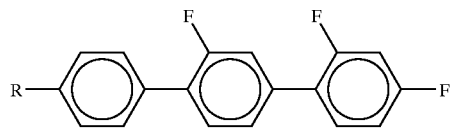

in which R is alkyl, alkenyl, alkoxy or alkenyloxy having 1 or 2 to 6 carbon atoms respectively.

p) Medium additionally comprising one or more tolans of the formula T1 and/or T2

T1

T2

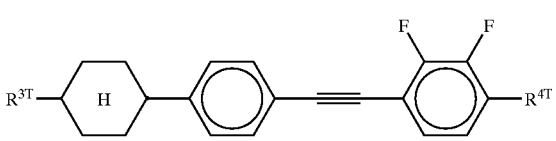

in which
$R^{3T}$ and $R^{4T}$ are each, independently of one another, alkyl, alkoxy, alkenyl, alkenyloxy or alkylalkoxy having from 1 to 7 carbon atoms.

q) Highly polar mixtures comprise, besides one or more compounds of the formula I, one or more, preferably one or two, esters or nitriles of the formulae

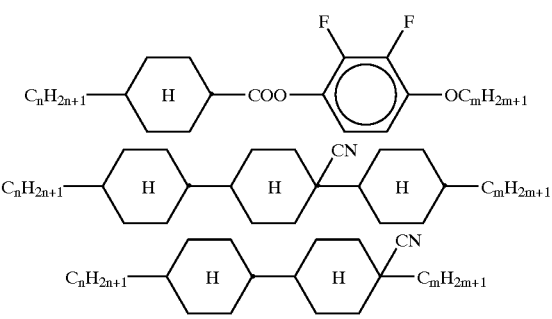

in which m and n are each, independently of one another, 1–12. Mixtures of this type are particularly suitable for the IPS mode with Δ∈<0.

The invention furthermore relates to an electro-optical display with active matrix addressing based on the ECB effect, characterised in that it comprises, as dielectric, a liquid-crystalline medium according to one of claims 1 to 13.

The liquid-crystal mixture preferably has a nematic phase range of at least 60 K and a flow viscosity $v_{20}$ of at most 30 $mm^2 \cdot s^{-1}$ at 20° C.

The liquid-crystal mixture according to the invention has a Δ∈ of from about −0.5 to −8.0, in particular from about −3.0 to −5.0, where Δ∈ denotes the dielectric anisotropy. The rotational viscosity $\gamma_1$ is preferably <225 mPa·s, in particular <180 mPa·s.

The birefringence Δn in the liquid-crystal mixture is generally between 0.04 and 0.16, preferably between 0.06 and 0.13. The dielectric constant $\in_{//}$ is greater than or equal to 3, preferably from 3.2 to 8.5.

The dielectrics may also comprise further additives known to the person skilled in the art and described in the literature. For example, 0–15% of pleochroic dyes may be added, furthermore conductive salts, preferably ethyldimethyldodecylammonium 4-hexyloxy-benzoate, tetrabutylammonium tetraphenylboranate or complex salts of crown ethers (cf., for example, Haller et al., Mol. Cryst. Liq. Cryst. Volume 24, pages 249–258 (1973)) may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728. Furthermore, UV stabilisers and antioxidants may be added to the mixture.

The individual components of the formulae I, II, III and IV of the liquid-crystal phases according to the invention are either known or their methods of preparation can easily be derived from the prior art by the person skilled in the relevant art since they are based on standard methods described in the literature.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.3$. It preferably comprises compounds of the formulae I and II.

The proportion of component A is preferably between 45 and 100%, in particular between 60 and 100%.

For component A, one (or more) individual compound(s) which has (have) a value of $\Delta \in$ of $\leq -0.8$ is (are) preferably selected. This value must be more negative the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably from 18 to 25 components. The phases preferably comprise from 4 to 15, in particular from 5 to 12, compounds of the formulae I, II and optionally III.

Besides compounds of the formulae I, II, III and IV, other constituents may also be present, for example in an amount of up to 45% of the mixture as a whole, but preferably up to 35%, in particular up to 10%.

The other constituents are preferably selected from nematic or nemato-genic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexyl-pyrimidines, phenyl- or cyclohexyldioxanes, optionally halogenated stilbenes, benzyl phenyl ethers, tolans and substituted cinnamic acids.

The most important compounds which are suitable as constituents of liquid-crystal phases of this type can be characterised by the formula VII $$R^9\text{—L—G—E—}R^{10} \qquad \text{VII}$$

in which L and E are each a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is —CH=CH— —N(O)=N—
—CH—CQ- —CH=N(O)—
—C≡C— —CH$_2$—CH$_2$—
—CO—O— —CH$_2$—O—
—CO—S— —CH$_2$—S—
—CH=N— —COO-Phe-COO— or a C—C single bond, Q is halogen, preferably chlorine, or —CN, and $R^9$ and $R^{10}$ are each alkyl, alkenyl, alkoxy, alkanoyloxy or alkoxycarbonyloxy having up to 18, preferably up to 8, carbon atoms, or one of these radicals is alternatively CN, NC, NO$_2$, NCS, CF$_3$, OCF$_3$, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are also commercially available. All these substances can be prepared by methods known from the literature.

It goes without saying to the person skilled in the art that the ECB mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages are percent by weight; all temperatures are indicated in degrees Celsius.

Besides the compounds of the formula I, the mixtures according to the invention preferably comprise one or more of the compounds shown below in Table A.

The following abbreviations are used:
(n and m=1–12; z=1–6)

PCH-nOmFF

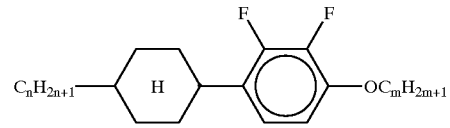

CCP-nOmFF

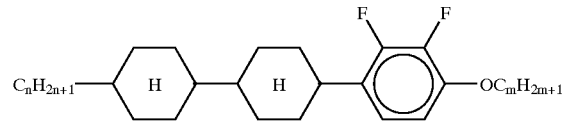

-continued
CCP-nmFF
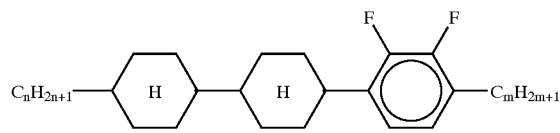
D-nOmFF
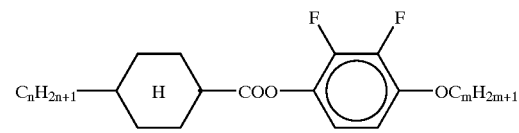
CBC-nmF
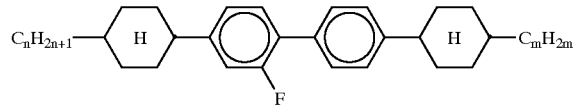
CBC-nm
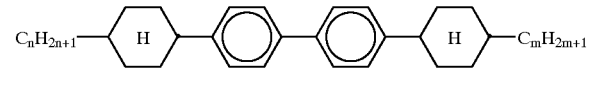
CCP-V-m
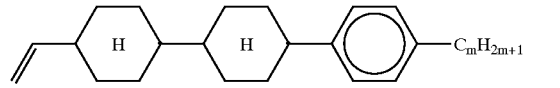
CCP-Vn-m
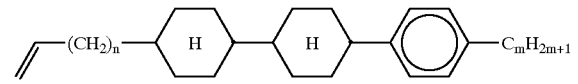
CPYC-n-m
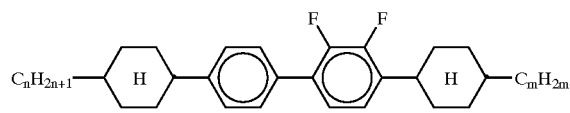
CYYC-n-m
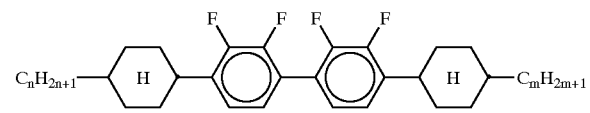
CCYY-n-(O)m
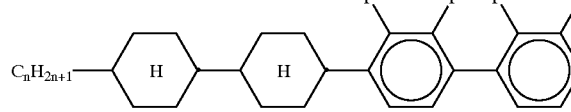
CCH-nOm
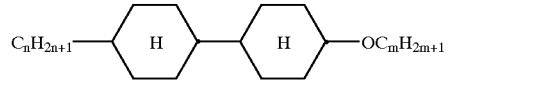
CY-n-m
CCH-nm
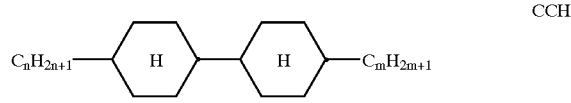
CC-n-V
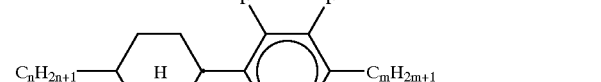
CC-n-V1
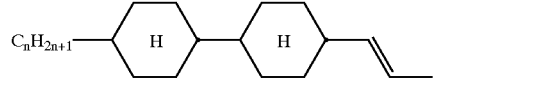
CP-nOmFF
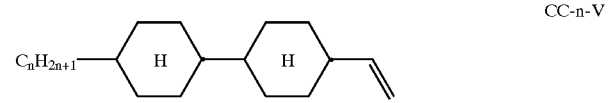
CH-nm
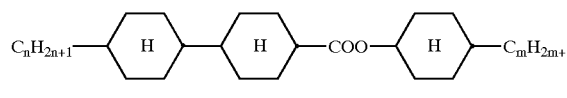
CEY-V-n
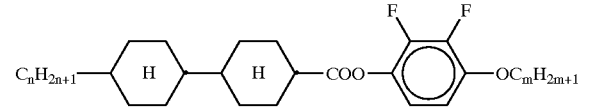
CCEY-n-m
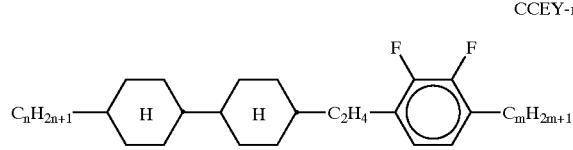
CVY-V-n
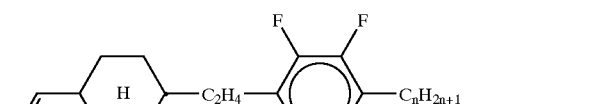
CY-V-On
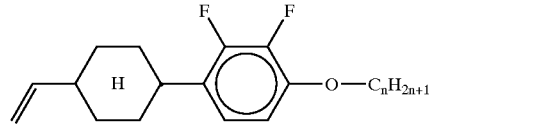
CY-1V-On
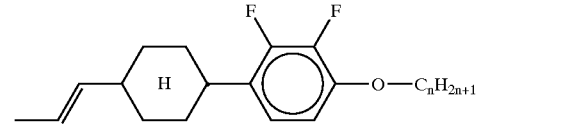

-continued
CY-n-O1V
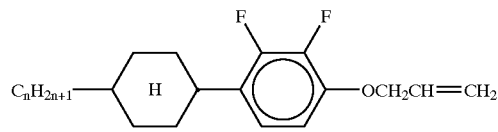
CY-n-OC(CH₃)=CH₂
BCN-nm
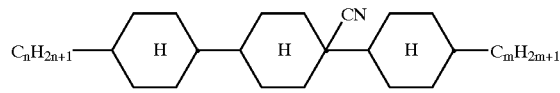
CCN-nm
CY-n-OV
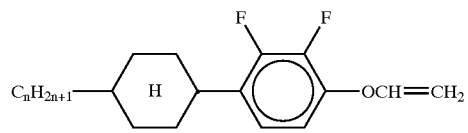
PCH-nm
PCH-nOm
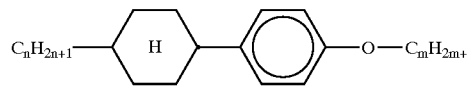
PGIGI-n-F
BCH-nm
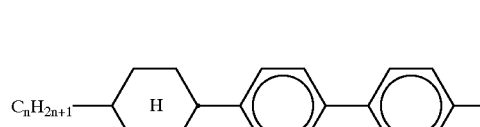
CCPC-nm
CCY-n-zOm
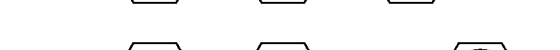
CPY-n-Om
CPY-V-Om
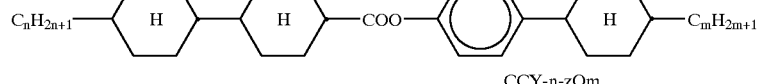
CPY-n-m
CQY-n-(O)m
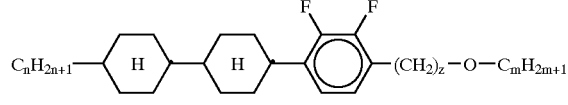
CQIY-n-(O)m
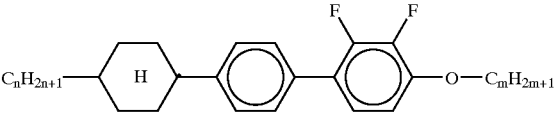
CCQY-n-(O)m
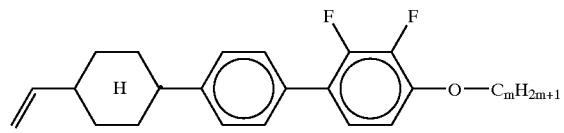
CCQIY-n-(O)m
CPQY-n-(O)m
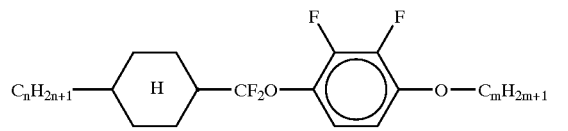
CPQIY-n-(O)m
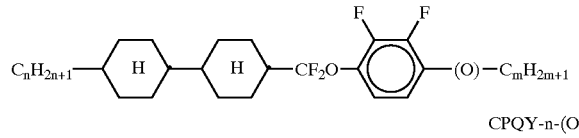
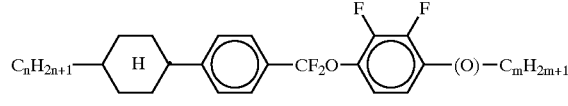
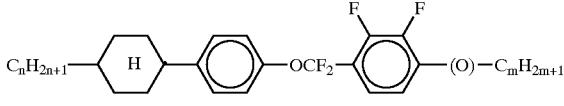

-continued
CCY-V-(O)m
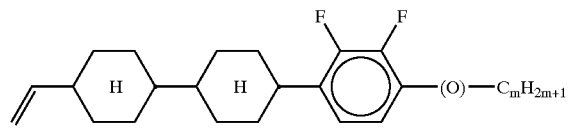
PTP-n(O)mFF
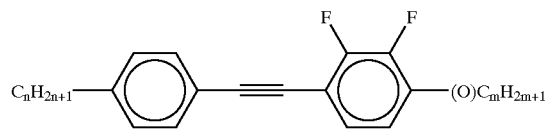
PNap-n(O)mFF
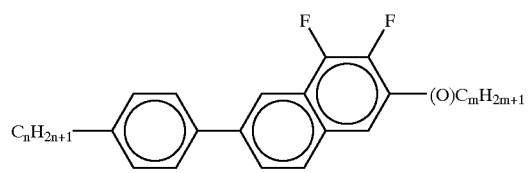
PNap-n(O)mFF
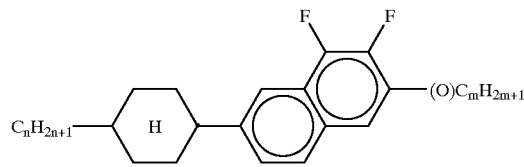
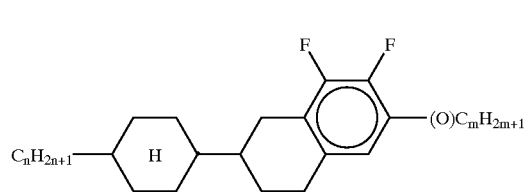
CPTP-n(O)mFF
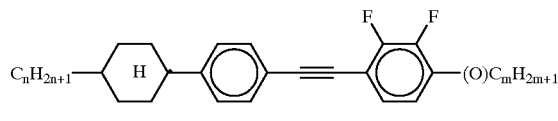
ECCP-nm
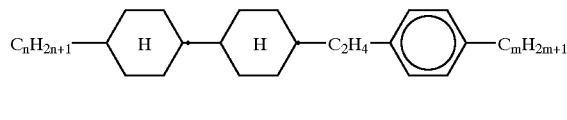
PNapF·n(O)nFF
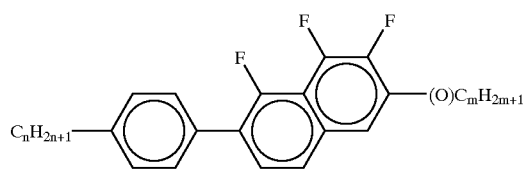
CNapF-n(O)mFF
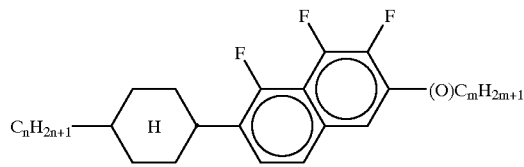
CHNap-n(O)mFF
TABLE B
Table B shows possible dopants which can be added to the mixtures according to the invention.
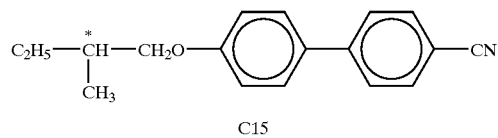
C15
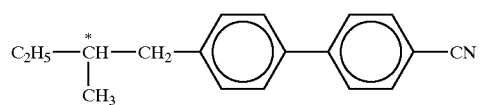
CB15
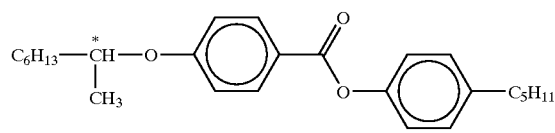
CM21

TABLE B-continued
Table B shows possible dopants which can be added to the mixtures according to the invention.
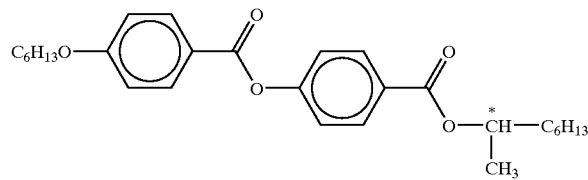
R/S 811
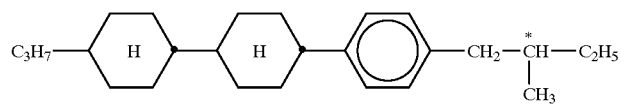
CM44
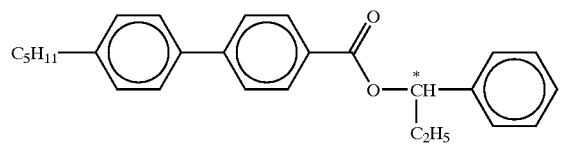
CM45
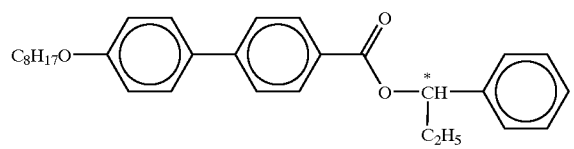
CM47
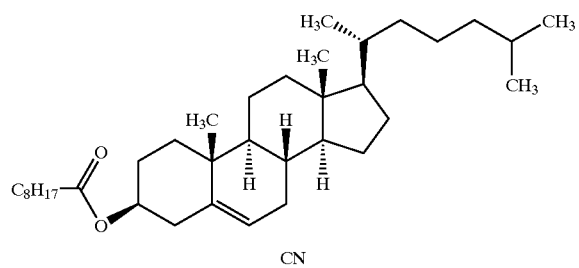
CN
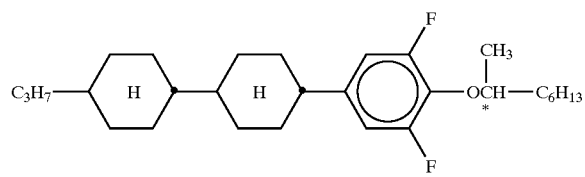
R/S-2011
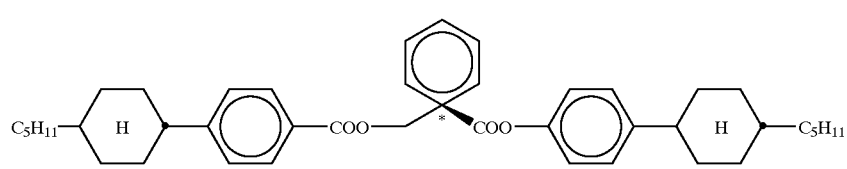
R/S-1011

TABLE B-continued

Table B shows possible dopants which can be added to the mixtures according to the invention.

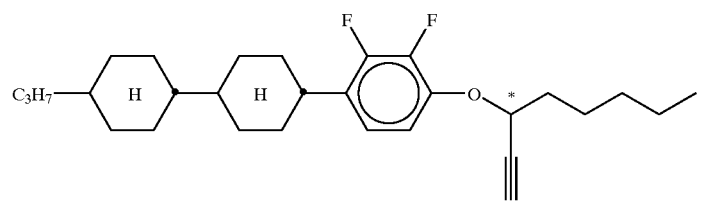

R/S-3011

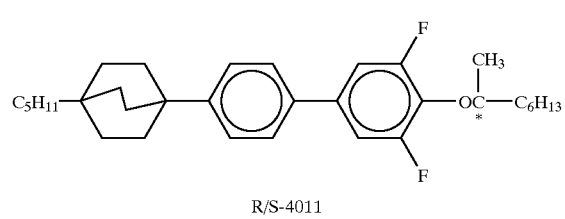

R/S-4011

Furthermore:

$V_o$ denotes the capacitive threshold voltage [V] at 20° C.

$\Delta n$ denotes the optical anisotropy measured at 20° C. and 589 nm $\Delta \epsilon$ denotes the dielectric anisotropy at 20° C. and 1 kHz cp. denotes the clearing point [° C.]

$\gamma_1$ denotes the rotational viscosity measured at 20° C. [mPa·s]

LTS denotes the low-temperature stability [h]

HR denotes the voltage holding ratio (after 5 minutes at 100° C., 1 V) [%]

The display used for measurement of the threshold voltage has two plane-parallel outer plates at a separation of 20 μm and electrode layers covered by alignment layers of lecithin on the insides of the outer plates which cause a homeotropic alignment of the liquid crystals.

MIXTURE EXAMPLES

Example 1

| | |
|---|---|
| PCH-304FF | 12.0% |
| PCH-502FF | 12.0% |
| PCH-504FF | 15.0% |
| CCP-202FF | 6.0% |
| CCP-302FF | 6.0% |
| CCP-502FF | 8.0% |
| CCP-21FF | 6.0% |
| CCP-31FF | 14.0% |
| CC-3-V1 | 3.0% |
| BCH-32 | 8.0% |
| CCP-V-1 | 5.0% |
| | 5.0% |

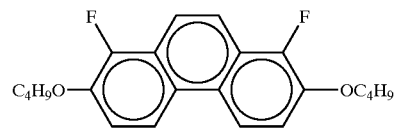

| | |
|---|---|
| Clearing point [° C.]: | 84.5 |
| Δn [589 nm, 20° C.]: | +0.1044 |
| Δε [1 kHz, 20° C.]: | −5.2 |
| ε∥ [1 kHz, 20° C.]: | 4.0 |
| $\gamma_1$ [mPa · s, 20° C.]: | 229 |
| $V_o$ [V]: | 1.86 |
| LTS in cells: | nem. > 1000 h at −20° C., −30° C. |

Example 2

| | |
|---|---|
| PCH-304FF | 8.0% |
| PCH-502FF | 8.0% |
| PCH-504FF | 7.0% |
| CCP-202FF | 5.0% |
| CCP-302FF | 7.0% |
| CCP-502FF | 8.0% |
| CCP-21FF | 13.0% |
| CCP-31FF | 13.0% |
| CCP-V-1 | 10.0% |
| CC-3-V1 | 9.0% |
| | 4.0% |

C₄H₉O—[structure]—OC₄H₉

| | 4.0% |
|---|---|

C₂H₅O—[structure]—OC₆H₁₃

| | |
|---|---|
| CPTP-302FF | 4.0% |
| Clearing point [° C]: | 105.7 |
| Δn [589 nm, 20° C.]: | +0.1099 |
| Δε [1 kHz, 20° C.]: | −4.8 |
| $\gamma_1$ [mPa · s, 20° C.]: | 315 |
| LTS in cells: | nem. > 1000 h at −30° C., −40° C. |

Example 3

| | |
|---|---|
| PCH-304FF | 8.0% |
| PCH-502FF | 4.0% |
| PCH-504FF | 8.0% |
| CCP-202FF | 5.0% |
| CCP-302FF | 7.0% |
| CCP-502FF | 8.0% |
| CCP-21FF | 12.0% |
| CCP-31FF | 12.0% |
| CCP-V-1 | 10.0% |
| CC-3-V1 | 11.0% |
| C₄H₉O—[ring]—OC₄H₉ (F,F substituted) | 6.0% |
| C₂H₅O—[ring]—OC₆H₁₃ (F,F substituted) | 4.0% |
| CPY-V-02 | 5.0% |
| Clearing point [° C.]: | 106.3 |
| Δn [589 nm, 20° C.]: | +0.1087 |
| Δε [1 kHz, 20° C.]: | −4.6 |
| $\gamma_1$ [mPa · s, 20° C.]: | 271 |
| LTS in cells: | nem. > 1000 h at −30° C., −40° C. |

Example 4

| | |
|---|---|
| PCH-304FF | 8.0% |
| PCH-502FF | 4.0% |
| PCH-504FF | 8.0% |
| CCP-202FF | 7.0% |
| CCP-302FF | 8.0% |
| CCP-502FF | 10.0% |
| CCP-21FF | 12.0% |
| CCP-31FF | 12.0% |
| CCP-V-1 | 10.0% |
| CC-3-V1 | 11.0% |
| C₄H₉O—[ring]—OC₄H₉ (F,F substituted) | 6.0% |
| C₂H₅O—[ring]—OC₆H₁₃ (F,F substituted) | 4.0% |
| Clearing point [° C.]: | 105.9 |
| Δn [589 nm, 20° C.]: | +0.1051 |
| Δε [1 kHz, 20° C.]: | −4.7 |
| $\gamma_1$ [mPa · s, 20° C.]: | 277 |
| LTS in cells: | nem. > 1000 h at −30° C., −40° C. |

Example 5

| | |
|---|---|
| PCH-304FF | 6.0% |
| PCH-502FF | 8.0% |
| PCH-504FF | 8.0% |
| CCP-202FF | 3.0% |
| CCP-302FF | 6.0% |
| CCP-502FF | 9.0% |
| CCP-21FF | 13.0% |
| CCP-31FF | 13.0% |
| CCP-V-1 | 10.0% |
| CC-3-V1 | 6.0% |
| C₄H₉O—[ring]—OC₄H₉ (F,F substituted) | 5.0% |
| C₂H₅O—[ring]—OC₆H₁₃ (F,F substituted) | 5.0% |
| CPQIY-3-02 | 6.0% |
| CCEY-5-1 | 2.0% |
| Clearing point [° C.]: | 104.9 |
| Δn [589 nm, 20° C.]: | +0.1084 |
| Δε [1 kHz, 20° C.]: | −4.9 |
| $\gamma_1$ [mPa · s, 20° C.]: | 273 |
| LTS in cells: | nem. > 1000 h at −30° C., −40° C. |

Example 6

| | |
|---|---|
| PCH-304FF | 10.0% |
| PCH-502FF | 4.0% |
| PCH-504FF | 9.0% |
| CCP-21FF | 9.0% |
| CCP-31FF | 10.0% |
| CCP-V-1 | 8.0% |
| CBC-33F | 5.0% |
| CBC-33 | 2.0% |
| CC-3-V1 | 3.0% |
| CC-5-V | 4.0% |
| PCH-302 | 2.0% |
| CPY-5-1 | 3.0% |
| CPY-V-02 | 4.0% |
| CPQIY-3-02 | 9.0% |
| CCY-V-02 | 7.0% |
| C₄H₉O—[ring]—OC₄H₉ (F,F substituted) | 6.0% |
| C₂H₅O—[ring]—OC₆H₁₃ (F,F substituted) | 5.0% |
| Clearing point [° C.]: | 104.8 |
| Δn [589 nm, 20° C.]: | +0.1167 |
| Δε [1 kHz, 20° C.]: | −4.5 |
| $\gamma_1$ [mPa · s, 20° C.]: | 256 |
| LTS in cells: | nem. > 1000 h at −30° C., −40° C. |

Example 7

| | |
|---|---|
| PCH-304FF | 18.0% |
| PCH-502FF | 18.0% |
| CCP-202FF | 6.0% |
| CCP-302FF | 6.0% |
| CCP-502FF | 3.0% |
| CCP-21FF | 8.0% |
| CCP-31FF | 6.0% |
| CC-3-V1 | 7.0% |
| PCH-302 | 6.0% |
| CCP-V-1 | 8.0% |
| CPY-2-1 | 5.0% |
| CPY-3-1 | 5.0% |
| | 4.0% |

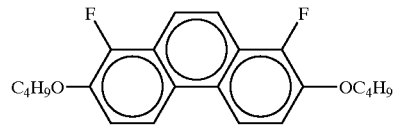

| | |
|---|---|
| Clearing point [° C.]: | 74.5 |
| $\Delta n$ [589 nm, 20° C.]: | +0.0985 |
| $\Delta \epsilon$ [1 kHz, 20° C.]: | −4.5 |
| $\gamma_1$ [mPa · s, 20° C.]: | 161 |
| LTS in cells: | nem. > 1000 h at −20° C. |

Example 8

| | |
|---|---|
| PCH-304FF | 17.0% |
| PCH-502FF | 18.0% |
| CCP-202FF | 6.0% |
| CCP-502FF | 5.0% |
| CCP-21FF | 8.0% |
| CCP-31FF | 6.0% |
| CC-3-V1 | 6.0% |
| PCH-301 | 6.0% |
| CCP-V-1 | 8.0% |
| CPY-2-1 | 5.0% |
| CPY-3-1 | 5.0% |
| | 4.0% |

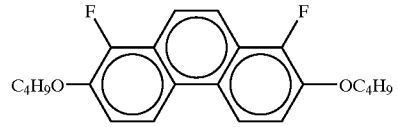

| | |
|---|---|
| CCEY-5-1 | 2.0% |
| CPY-V-02 | 4.0% |
| Clearing point [° C.]: | 75.2 |
| $\Delta n$ [589 nm, 20° C.]: | +0.1021 |
| $\Delta \epsilon$ [1 kHz, 20° C.]: | −4.4 |
| $\gamma_1$ [mPa · s, 20° C.]: | 158 |
| LTS in cells: | nem. > 1000 h at −20° C. |

Example 9

| | |
|---|---|
| PCH-304FF | 15.0% |
| PCH-502FF | 14.0% |
| CCP-202FF | 6.0% |
| CCP-302FF | 7.0% |
| CCP-21FF | 8.0% |
| CCP-31FF | 6.0% |
| CC-5-V | 8.0% |
| CCH-35 | 3.0% |
| CY-1V-02 | 5.0% |
| CCP-V-1 | 9.0% |
| CPY-2-1 | 5.0% |
| CPY-3-1 | 5.0% |
| | 4.0% |

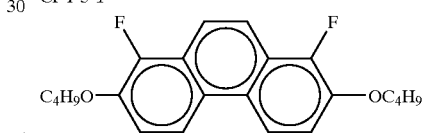

| | |
|---|---|
| PTP-302FF | 5.0% |
| Clearing point [° C.]: | 75.6 |
| $\Delta n$ [589 nm, 20° C.]: | +0.1071 |
| $\Delta \epsilon$ [1 kHz, 20° C.]: | −4.6 |
| $\gamma_1$ [mPa · s, 20° C.]: | 152 |
| LTS in cells: | nem. > 1000 h at −20° C. |

Example 10

| | | | |
|---|---|---|---|
| PCH-304FF | 14.0% | Clearing point [° C.]: | 88.1 |
| PCH-504FF | 14.0% | $\Delta n$ [589 nm, 20° C.]: | +0.1038 |
| CCP-302FF | 7.0% | $\Delta \epsilon$ [1 kHz, 20° C.]: | −4.9 |
| CCP-502FF | 6.0% | $\gamma_1$ [mPa · s, 20° C.]: | 215 |
| CCP-21FE | 11.0% | LTS in cells: | nem. >1000 h |
| CCP-31FF | 11.0% | at −20° C. | |
| CC-3-V1 | 9.0% | | |
| CC-5-V | 5.0% | | |
| BCH-32 | 4.0% | | |
| CPY-V-O2 | 9.0% | | |
| CPQIY-3-O2 | 5.0% | | |
| | 5.0% | | |

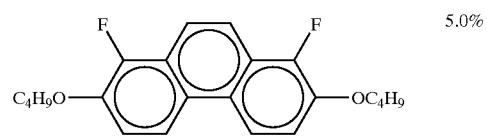

Example 11

| | | | |
|---|---|---|---|
| PCH-304FF | 9.0% | Clearing point [° C.]: | 85.8 |
| PCH-502FF | 8.0% | Δn [589 nm, 20° C.]: | +0.1100 |
| PCH-504FF | 9.0% | Δε [1 kHz, 20° C.]: | −4.7 |
| CCP-21FF | 5.0% | $\gamma_1$ [mPa · s, 20° C.]: | 202 |
| CCP-31FF | 10.0% | LTS in cells: | nem. >1000 h |
| CPY-2-1 | 5.0% | at −20° C. | |
| CPY-3-1 | 5.0% | | |
| BCH-32 | 4.0% | | |
| PCH-302 | 3.0% | | |
| CC-5-V | 10.0% | | |
| CCY-V-O2 | 12.0% | | |
| CPQIY-3-O2 | 11.0% | | |

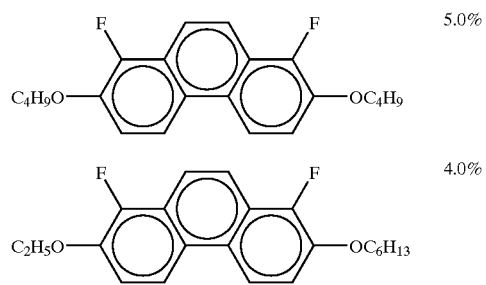

Example 12

| | | | |
|---|---|---|---|
| PCH-304FF | 16.0% | Clearing point [° C.]: | 85.1 |
| PCH-504FF | 15.0% | Δn [589 nm, 20° C.]: | +0.1074 |
| CCP-302FF | 8.0% | Δε [1 kHz, 20° C.]: | −5.0 |
| CCP-502FF | 6.0% | $\gamma_1$ [mPa · s, 20° C.]: | 225 |
| CCP-21FF | 14.0% | LTS in cells: | nem. >1000 h |
| CCP-31FF | 13.0% | at −20° C. | |
| CC-5-V | 10.0% | | |
| PCH-53 | 3.0% | | |
| CPTP-302FF | 7.0% | | |
| CPTP-502FF | 3.0% | | |

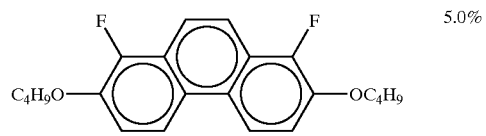

Example 13

| | | | |
|---|---|---|---|
| PCH-304FF | 7.0% | Clearing point [° C.]: | 86.6 |
| PCH-504FF | 18.0% | Δn [589 nm, 20° C.]: | +0.1083 |
| CCP-202FF | 7.0% | Δε [1 kHz, 20° C.]: | −5.3 |
| CCP-302FF | 9.0% | $\gamma_1$ [mPa · s, 20° C.]: | 211 |
| CCP-502FF | 7.0% | LTS in cells: | nem. >1000 h |
| CCP-21FF | 9.0% | at −20° C. | |
| CCP-31FF | 14.0% | | |
| CC-3-V1 | 12.0% | | |
| CCH-35 | 3.0% | | |
| PTP-302FF | 5.0% | | |
| PTP-502FF | 4.0% | | |

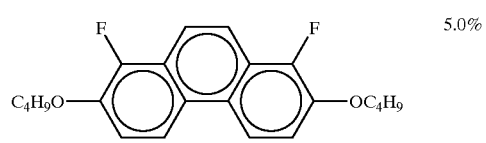

Example 14

| | | | |
|---|---|---|---|
| CC-5-V | 9.0% | Clearing point [° C.]: | 71.6 |
| CC-3-V1 | 9.0% | Δn [589 nm, 20° C.]: | +0.0842 |
| PCH-53 | 4.0% | Δε [1 kHz, 20° C.]: | −3.6 |
| PCH-304FF | 12.0% | γ₁ [mPa · s, 20° C.]: | 133 |
| PCH-502FF | 11.0% | LTS in cells: | nem. >1000 h |
| PCH-504FF | 11.0% | at −20° C., −30° C., −40° C. | |
| CCP-302FF | 5.0% | | |
| CCP-502FF | 8.0% | | |
| CCP-21FF | 9.0% | | |
| CCP-31FF | 9.0% | | |
| CCH-35 | 4.0% | | |
| ECCP-31 | 5.0% | | |

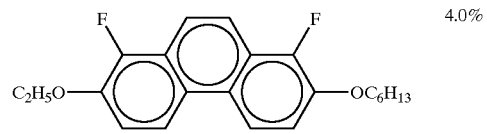 4.0%

Example 15 (IPS Mixture)

| | | | |
|---|---|---|---|
| D-302FF | 20.0% | Clearing point [° C.]: | 71.2 |
| D-502FF | 10.0% | Δn [589 nm, 20° C.]: | +0.0971 |
| PCH-304FF | 10.0% | Δε [1 kHz, 20° C.]: | −7.9 |
| PCH-504FF | 16.0% | γ₁ [mPa · s, 20° C.]: | 228 |
| CCP-302FF | 9.0% | | |
| CCP-502FF | 6.0% | | |
| CC-3-V1 | 5.0% | | |
| CCH-35 | 3.0% | | |

C₄H₉O—[ring system with F substituents]—OC₄H₉ 4.0%

C₂H₅O—[ring system with F substituents]—OC₆H₁₃ 4.0%

C₆H₁₃O—[ring system with F substituents]—OC₆H₁₃ 3.0%

| | |
|---|---|
| CPQIY-3-O2 | 10.0% |

Example 16 (IPS Mixture)

| | | | |
|---|---|---|---|
| D-302FF | 20.0% | Clearing point [° C.]: | 74.8 |
| D-502FF | 10.0% | Δn [589 nm, 20° C.]: | +0.0977 |
| PCH-304FF | 9.0% | Δε [1 kHz, 20° C.]: | −8.1 |
| PCH-504FF | 16.0% | γ₁ [mPa · s, 20° C.]: | 231 |
| CCP-302FF | 9.0% | | |
| CCP-502FF | 6.0% | | |
| CC-3-V1 | 5.0% | | |
| CCH-35 | 3.0% | | |

-continued

| | |
|---|---|
| 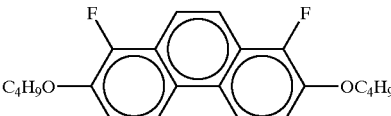 C₄H₉O—[ring]—[ring]—OC₄H₉ (with F substituents) | 4.0% |
| 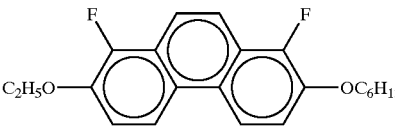 C₂H₅O—[ring]—[ring]—OC₆H₁₃ (with F substituents) | 4.0% |
| 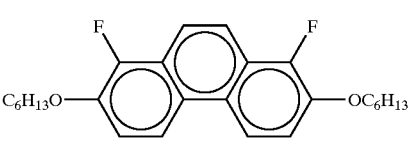 C₆H₁₃O—[ring]—[ring]—OC₆H₁₃ (with F substituents) | 4.0% |
| CPQIY-3-O2 | 5.0% |
| CCY-V-O2 | 5.0% |

Example 17

| | | | |
|---|---|---|---|
| PCH-304FF | 10.0% | Clearing point [° C.]: | 74.7 |
| PCH-502FF | 14.0% | Δn [589 nm, 20° C.]: | +0.0785 |
| CCP-302FF | 10.0% | Δε [1 kHz, 20° C.]: | −4.2 |
| CCP-502FF | 10.0% | γ₁ [mPa · s, 20° C.]: | 125 |
| CCP-21FF | 4.0% | LTS in cells: | nem. >1000 h |
| CCP-31FF | 3.0% | at −20° C. | |
| CCH-34 | 4.0% | | |
| CCH-35 | 4.0% | | |
| CCH-301 | 10.0% | | |
| CCH-303 | 8.0% | | |
| CCH-501 | 8.0% | | |
| CH-33 | 3.0% | | |
| CH-35 | 3.0% | | |
| 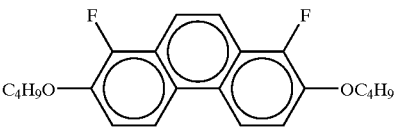 C₄H₉O—[ring]—[ring]—OC₄H₉ (with F substituents) | 5.0% | | |
| 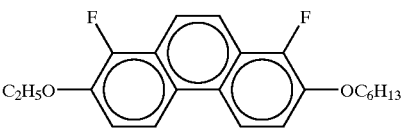 C₂H₅O—[ring]—[ring]—OC₆H₁₃ (with F substituents) | 4.0% | | |

Example 18

| | | | |
|---|---|---|---|
| PCH-304FF | 18.0% | Clearing point [° C.]: | +71.0 |
| PCH-502FF | 8.0% | Δn [589 nm, 20° C.]: | +0.1096 |
| PCH-504FF | 5.0% | Δε [1 kHz, 20° C.]: | −3.5 |
| BCH-32 | 8.0% | ε∥ [1 kHz, 20° C.]: | 3.7 |
| CCP-V-1 | 3.0% | γ₁ [mPa · s, 20° C.]: | 115 |
| PGIGI-3-F | 3.0% | V₀ [V]: | 2.03 |
| CC-5-V | 20.0% | LTS in cells: | nem. >1000 h |
| CC-3-V1 | 8.0% | at −20° C., −30° C., −40 ° C. | |
| CPY-2-O2 | 12.0% | | |
| CPY-3-O2 | 9.0% | | |

-continued
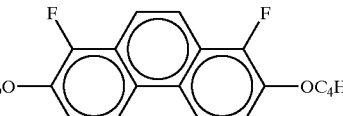 3.0%
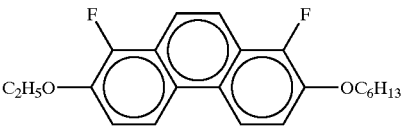 3.0%
Example 19
| | | | |
|---|---|---|---|
| PCH-304FF | 18.0% | Clearing point [° C.]: | +72.0 |
| PCH-502FF | 5.0% | Δn [589 nm, 20° C.]: | +0.1102 |
| BCH-32 | 8.0% | Δε [1 kHz, 20° C.]: | -3.2 |
| CC-5-V | 14.0% | ε∥[1 kHz, 20° C.]: | 3.6 |
| CC-3-V1 | 10.0% | γ₁ [mPa · s, 20° C.]: | 112 |
| CPY-2-O2 | 12.0% | V₀ [V]: | 2.12 |
| CPY-3-O2 | 12.0% | LTS in cells: at -20° C., -30° C. | nem. >1000 h |
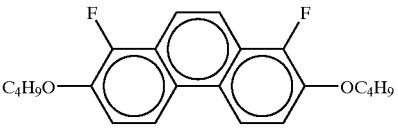 3.0%
 3.0%
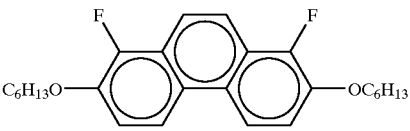 3.0%
| | |
|---|---|
| CCH-35 | 5.0% |
| PCH-53 | 7.0% |
Example 20
| | |
|---|---|
| PCH-304FF | 16.0% |
| PCH-504FF | 12.0% |
| PCH-502FF | 8.0% |
| BCH-32 | 8.0% |
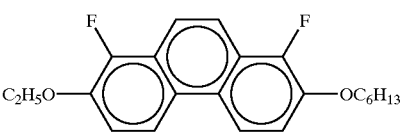 3.0%
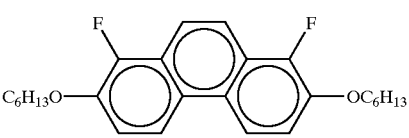 3.0%
-continued
| | |
|---|---|
| CCP-V2-1 | 8.0% |
| CC-5-V | 15.0% |
| CC-3-V1 | 8.0% |
| CPY-2-O2 | 5.0% |
| CPY-3-O2 | 9.0% |
| CCH-35 | 5.0% |
| Clearing point [° C.]: | +71.2 |
| Δn [589 nm, 20° C.]: | +0.0999 |
| Δε [1 kHz, 20° C.]: | -3.2 |
| ε∥ [1 kHz, 20° C.]: | 3.5 |
| γ₁ [mPa · s, 20° C.]: | 109 |
| V₀ [V]: | 2.14 |
| LTS in cells: | nem. > 1000 h at -20° C., -30° C., -40° C. |
| HR [%]: | 91 |

Example 21

| | |
|---|---|
| PCH-304FF | 12.0% |
| PCH-502FF | 6.0% |
| PCH-504FF | 17.0% |
| CCP-302FF | 14.0% |
| CCP-502FF | 9.0% |
| CCH-35 | 5.0% |
| CC-5-V | 5.0% |
| CC-3-V-1 | 7.0% |
| CCP-V-1 | 11.0% |

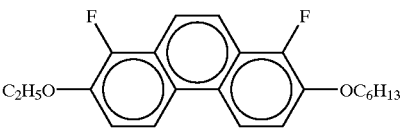 5.0%

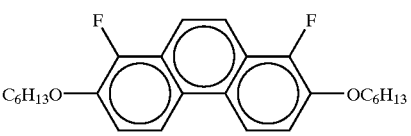 3.0%

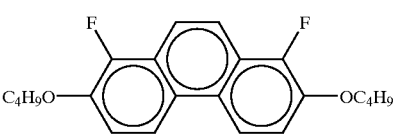 6.0%

| | |
|---|---|
| Clearing point [° C.]: | +82.5 |
| Δn [589 nm, 20° C.]: | +0.1022 |
| Δε [1 kHz, 20° C.]: | −4.9 |
| $\gamma_1$ [mPa · s, 20° C.]: | 172 |
| $V_o$ [V]: | 1.87 |
| LTS in cells: | nem. > 1000 h at −20° C. nem. ~850 h at −30° C. |
| HR [%]: | 88 |

Example 22

| | |
|---|---|
| PCH-304FF | 11.0% |
| PCH-502FF | 6.0% |
| PCH-504FF | 15.0% |
| CCP-302FF | 14.0% |
| CCP-502FF | 4.0% |
| CC-5-V | 10.0% |
| CC-3-V1 | 8.0% |
| CCH-35 | 5.0% |
| CCP-V-1 | 3.0% |
| CPY-2-O2 | 12.0% |
| CPY-3-O2 | 6.0% |

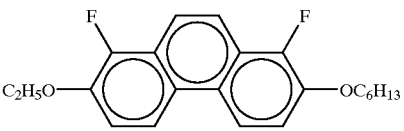 3.0%

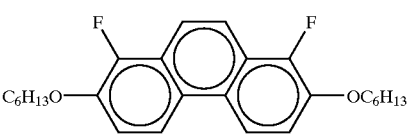 3.0%

| | |
|---|---|
| Clearing point [° C.]: | +82.5 |
| Δn [589 nm, 20° C.]: | +0.1028 |
| Δε [1 kHz, 20° C.]: | −4.7 |
| $\varepsilon_{II}$ [1 kHz, 20° C.]: | 3.8 |
| $\gamma_1$ [mPa · s, 20° C.]: | 170 |
| $V_o$ [V]: | 1.89 |
| LTS in cells: | nem. > 1000 h at −20° C., −30° C., −40° C. |
| HR [%]: | 87 |

Example 23

| | |
|---|---|
| PCH-304FF | 18.0% |
| PCH-502FF | 8.0% |
| BCH-32 | 2.0% |
| CCP-V2-1 | 6.0% |
| CC-5-V | 17.0% |
| CC-3-VI | 8.0% |
| CPY-2-O2 | 9.0% |
| CPY-3-O2 | 12.0% |

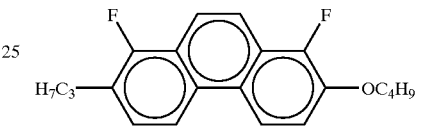 5.0%

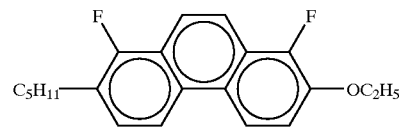 5.0%

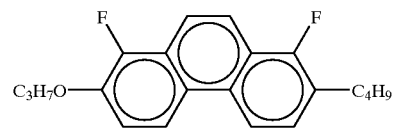 5.0%

| | |
|---|---|
| CCH-35 | 5.0% |
| Clearing point [° C.]: | 71.0 |
| Δn [589 nm, 20° C.]: | +0.1116 |
| Δε [1 kHz, 20° C.]: | −3.5 |
| $\varepsilon_{II}$ [1 kHz, 20° C.]: | 3.7 |
| $\gamma_1$ [mPa · s, 20° C.]: | 116 |
| $V_o$ [V]: | 2.04 |

Example 24

| | |
|---|---|
| PCH-304FF | 17.0% |
| PCH-502FF | 8.0% |
| PCH-504FF | 6.0% |
| BCH-32 | 8.0% |
| CCP-V-1 | 4.0% |
| CC-5-V | 18.0% |
| CC-3-V1 | 8.0% |
| CPY-2-O2 | 12.0% |
| CPY-3-O2 | 9.0% |

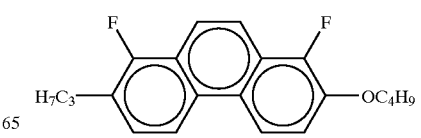 5.0%

-continued

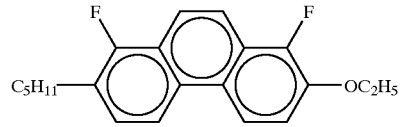 5.0%

| | |
|---|---|
| Clearing point [° C.]: | 69.6 |
| Δn [589 nm, 20° C.]: | +0.1115 |
| Δε [1 kHz, 20° C.]: | −3.5 |
| ε_∥ [1 kHz, 20° C.]: | 3.7 |
| γ₁ [mPa · s, 20° C.]: | 118 |
| V_o [V]: | 2.01 |
| LTS in cells: | nem. > 1000 h at −20° C., −30° C., −40° C. |

Example 25

| | |
|---|---|
| PCH-304FF | 15.0% |
| PCH-504FF | 14.0% |
| CPY-3-O2 | 10.0% |
| CPY-2-O2 | 10.0% |
| CC-5-V | 20.0% |
| CC-3-V1 | 8.0% |
| CCP-V2-1 | 8.0% |
| CCH-35 | 5.0% |

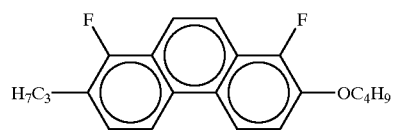 5.0%

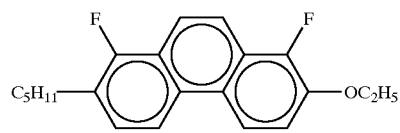 5.0%

| | |
|---|---|
| Clearing point [° C.]: | 69.0 |
| Δn [589 nm, 20° C.]: | +0.1012 |
| Δε [1 kHz, 20° C.]: | −3.2 |
| ε_∥ [1 kHz, 20° C.]: | 3.6 |
| γ₁ [mPa · s, 20° C.]: | 108 |
| V_o [V]: | 2.12 |
| LTS in cells: | nem. > 1000 h at −20° C., −30° C., −40° C. |
| HR [%]: | 92 |

Example 26

| | |
|---|---|
| PCH-304FF | 8.0% |
| PCH-502FF | 8.0% |
| PCH-504FF | 16.0% |
| CCP-302FF | 13.0% |
| CCP-502FF | 8.0% |
| CC-5-V | 8.0% |
| CC-3-V1 | 10.0% |
| CCH-35 | 5.0% |
| CPY-3-O2 | 6.0% |
| CPY-2-O2 | 12.0% |

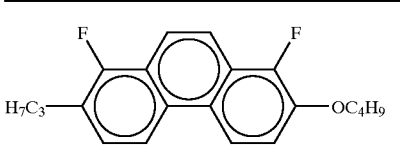 3.0%

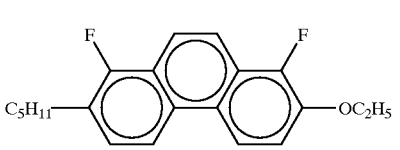 3.0%

| | |
|---|---|
| Clearing point [° C.]: | 83.5 |
| Δn [589 nm, 20° C.]: | 0.1041 |
| Δε [1 kHz, 20° C.]: | −4.9 |
| ε_∥ [1 kHz, 20° C.]: | 3.8 |
| γ₁ [mPa · s, 20° C.]: | 177 |
| V_o [V]: | 1.96 |

Example 27

| | |
|---|---|
| PCH-304FF | 18.0% |
| PCH-502FF | 8.0% |
| BCH-32 | 8.0% |
| CC-3-V1 | 8.0% |
| CC-5-V | 14.0% |
| CPY-3-O2 | 12.0% |
| CPY-2-O2 | 12.0% |

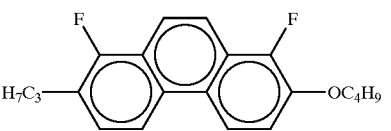 5.0%

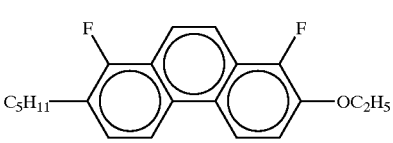 5.0%

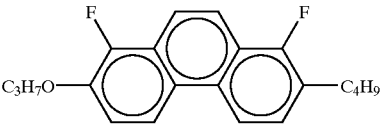 5.0%

| | |
|---|---|
| PGIGI-3-F | 5.0% |
| Clearing point [° C.]: | 72.0 |
| Δn [589 nm, 20° C.]: | 0.1287 |
| Δε [1 kHz, 20° C.]: | −3.8 |
| ε_∥ [1 kHz, 20° C.]: | 3.9 |
| γ₁ [mPa · s, 20° C.]: | 143 |
| V_o [V]: | 1.95 |

Example 28

| | |
|---|---|
| PCH-304FF | 17.0% |
| PCH-502FF | 8.0% |
| PCH-504FF | 8.0% |
| BCH-32 | 6.0% |
| CCH-35 | 2.0% |
| CCP-V2-1 | 2.0% |
| CC-3-V1 | 8.0% |
| CC-5-V | 17.0% |
| CPY-2-02 | 12.0% |
| CPY-3-02 | 12.0% |

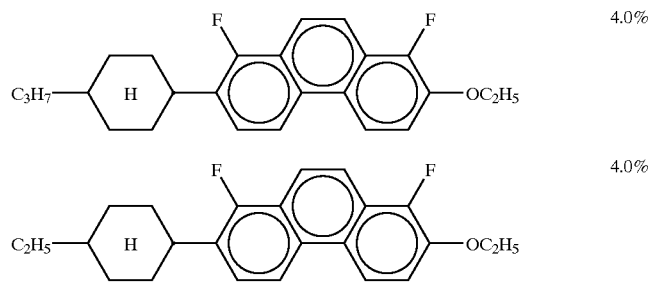

4.0%

4.0%

| | |
|---|---|
| Clearing point [° C.]: | 79.5 |
| Δn [589 nm, 20° C.]: | 0.1141 |
| Δε [1 kHz, 20° C.]: | −3.7 |
| γ₁ [mPa · s, 20° C.]: | 138 |
| V₀ [V]: | 2.0 |
| LTS in cells: | nem. > 1000 h at −20° C., −30° C. |

Example 29

| | |
|---|---|
| CBC-33 | 1.0% |
| BCH-32 | 8.0% |
| CC-3-V1 | 8.0% |
| CC-5-V | 7.0% |
| CCP-V-1 | 7.0% |
| CPY-2-02 | 12.0% |
| CPY-3-02 | 12.0% |
| PCH-304FF | 10.0% |
| PCH-502FF | 10.0% |
| PCH-504FF | 10.0% |
| PCH-53 | 5.0% |
| PGIGI-3-F | 4.0% |

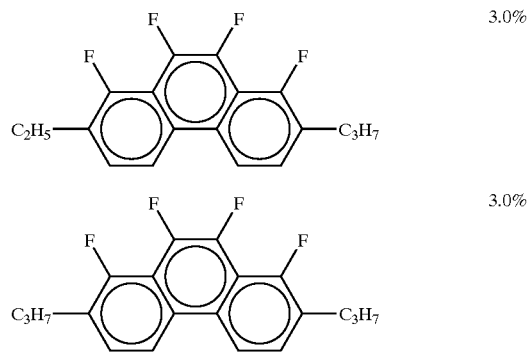

3.0%

3.0%

| | |
|---|---|
| Clearing point [° C.]: | 75.0 |
| Δn [589 nm, 20° C.]: | 0.1228 |
| Δε [1 kHz, 20° C.]: | −3.7 |
| γ₁ [mPa · s, 20° C.]: | 150 |
| V₀ [V]: | 2.05 |
| LTS in cells: | nem. > 1000 h at −20° C., −30° C. |

What is claimed is:

1. A liquid-crystalline medium based on a mixture of polar compounds of negative dielectric anisotropy which comprises at least one compound of formula I

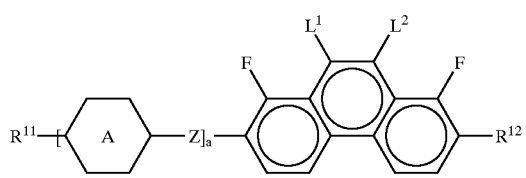

in which $R^{11}$ and $R^{12}$ are each, independently of one another, an alkyl or alkenyl radical having up to 15 carbon atoms which is unsubstituted, monosubstituted by CN or CF3 or at least monosubstituted by halogen, where, in addition, one or more CH₂ groups in these radicals may each, independently of one another, be replaced by —O—, —S—,

—C≡C—, —CO—, —CO—O—, -O-CO— or —O—CO—O— in such a way that O atoms are not linked directly to one another, $L^1$ and $L^2$ are each, independently of one another, H or F,

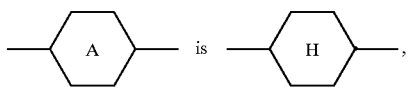

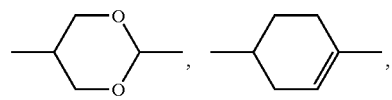

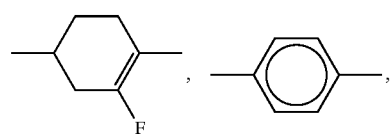

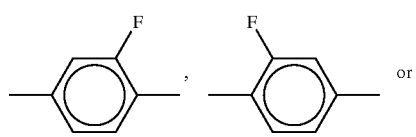

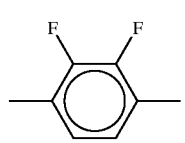

Z is —CF$_2$O-, —OCF$_2$—, —C≡C—, —CF=CF—, —C$_2$F$_4$—, —COO—, —CH$_2$O—, —OCH$_2$—, —OCO— or a single bond, a is 0 or 1, and one or more compounds of formula III

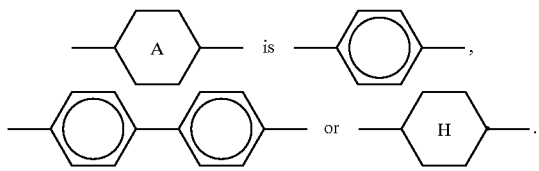

III in which
  $R^{31}$ and $R^{32}$ are each, independently of one another, a straight-chain alkylalkoxy, alkyl or alkoxy radical having 1–12 carbon atoms, and

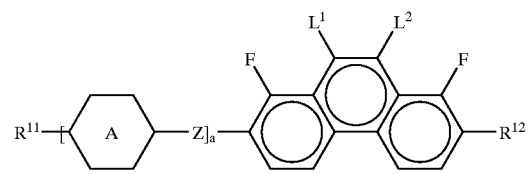

2. A liquid crystalline medium based on a mixture of polar compounds of negative dielectric anisotropy which comprises at least one compound of formula I

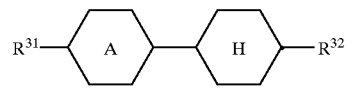

I in which $R^{11}$ and $R^{12}$ are each, independently of one another, an alkyl or alkenyl radical having up to 15 carbon atoms which is unsubstituted, monosubstituted by CN or —CF$_3$— or at least monosubstituted by halogen, where, in addition, one or more CH$_2$ groups in these radicals may each, independently of one another, be replaced by —O—, —S—,

—C≡C—, —O—, —CO—O—, -O-CO— or —O—CO—O— in such a way that 0 atoms are not linked directly to one another, $L^1$ and $L^2$ are each, independently of one another, H or F

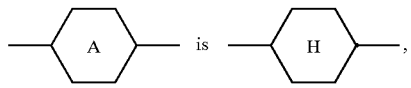

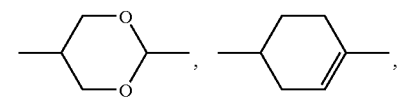

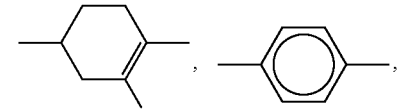

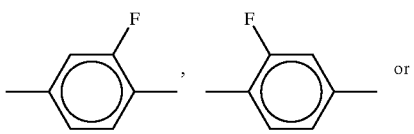

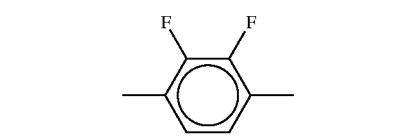

Z is —CF$_2$O-, —OCF$_2$—, —C≡C—, —CF=CF—, —C$_2$F$_4$—, —COO—, —CH$_2$O—, —OCH$_2$—, —OCO— or a single bond, a is 0 or 1, additionally comprising one or more compounds of formula II

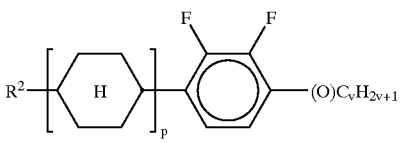

II in which
  $R^2$ is as defined for $R^{11}$ and $R^{12}$,
  p is 1 or 2, and
  v is from 1 to 6.

3. A liquid crystalline medium based on a mixture of polar compounds of negative dielectric anisotropy which comprises at least one compound of formula I

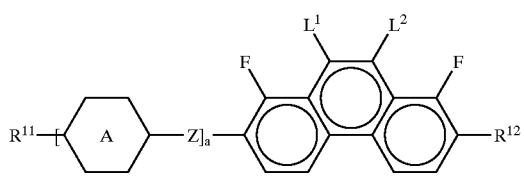

in which
R$^{11}$ and R$^{12}$ are each, independently of one another, an alkyl or alkenyl radical having up to 15 carbon atoms which is unsubstituted, monosubstituted by CN or —CF$_3$— or at least monosubstituted by halogen, where, in addition, one or more CH$_2$ groups in these radicals may each, independently of one another, be replaced by —O—, —S—,

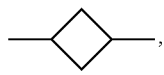

—C≡C—, —CO—, —CO—O—, -O-CO— or —O—CO—O— in such a way that 0 atoms are not linked directly to one another,
L$^1$ and L$^2$ are each, independently of one another, H or F

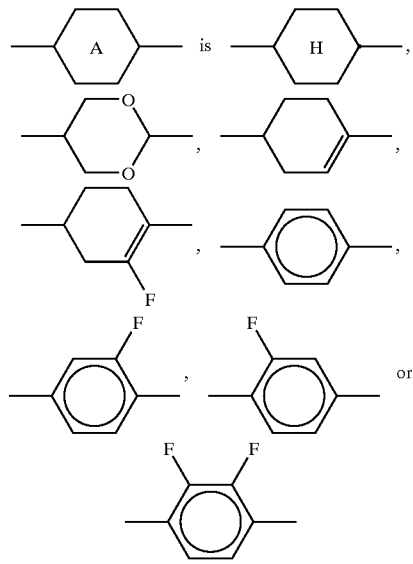

Z is —CF$_2$O-, —OCF$_2$—, —C≡C—, —CF=CF—, —C$_2$F$_4$—, —COO—, —CH$_2$O—, —OCH$_2$—, —OCO— or a single bond,
a is 0 or 1, and
at least one compound of the formula IV

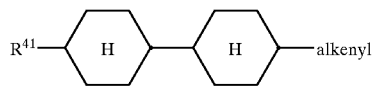

in which
R$^{41}$ is an alkyl or alkenyl radical having up to 15 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—,

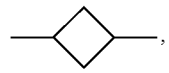

—C≡C—, —CO—, —CO—O—, —O—CO— or —O—CO—O— in such a way that 0 atoms are not linked directly to one another.

4. Medium according to claim 1, comprising one, two or three compounds of formula I.

5. Medium according to claim 1, wherein the proportion of compounds of the formula I in the mixture as a whole is at least 3% by weight.

6. Medium according to claim 2, wherein the proportion of compounds of the formula II in the mixture as a whole is at least 20% by weight.

7. Liquid-crystalline medium according to claim 1, comprising at least one compound of the formulae IIIa to IIIe:

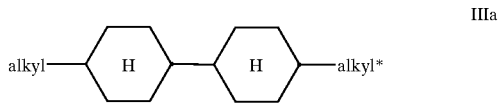

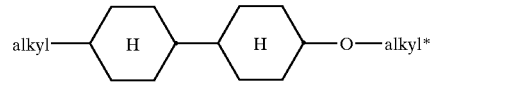

in which
alkyl and alkyl* are each, independently of one another, a straight-chain alkyl radical having 1–6 carbon atoms.

8. Liquid-crystalline medium according to claim 7, comprising at least one compound of the formula IIIa and/or at least one compound of the formula IIIb.

9. Liquid-crystalline medium according to claim 1, additionally comprising one or more compounds of the formulae Va to Vg:

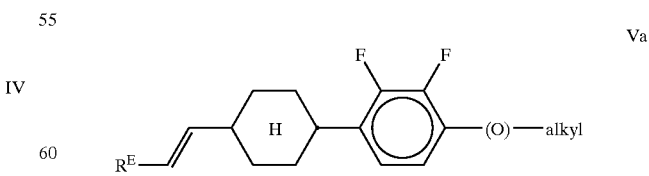

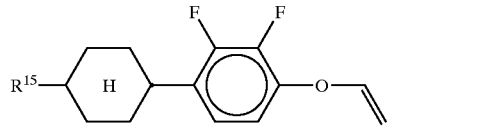

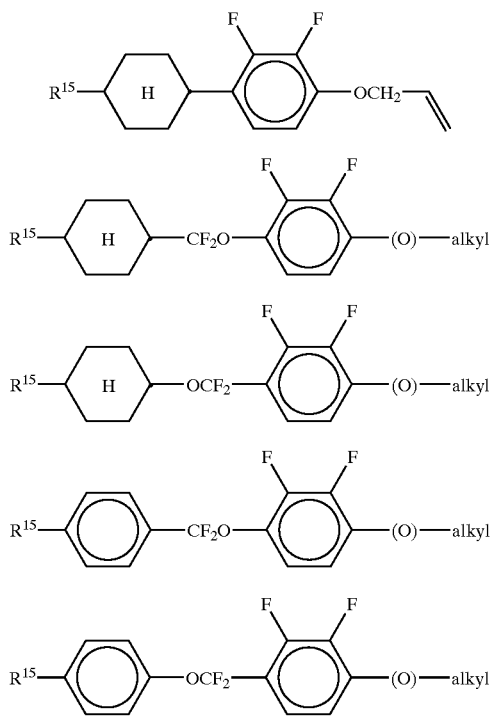

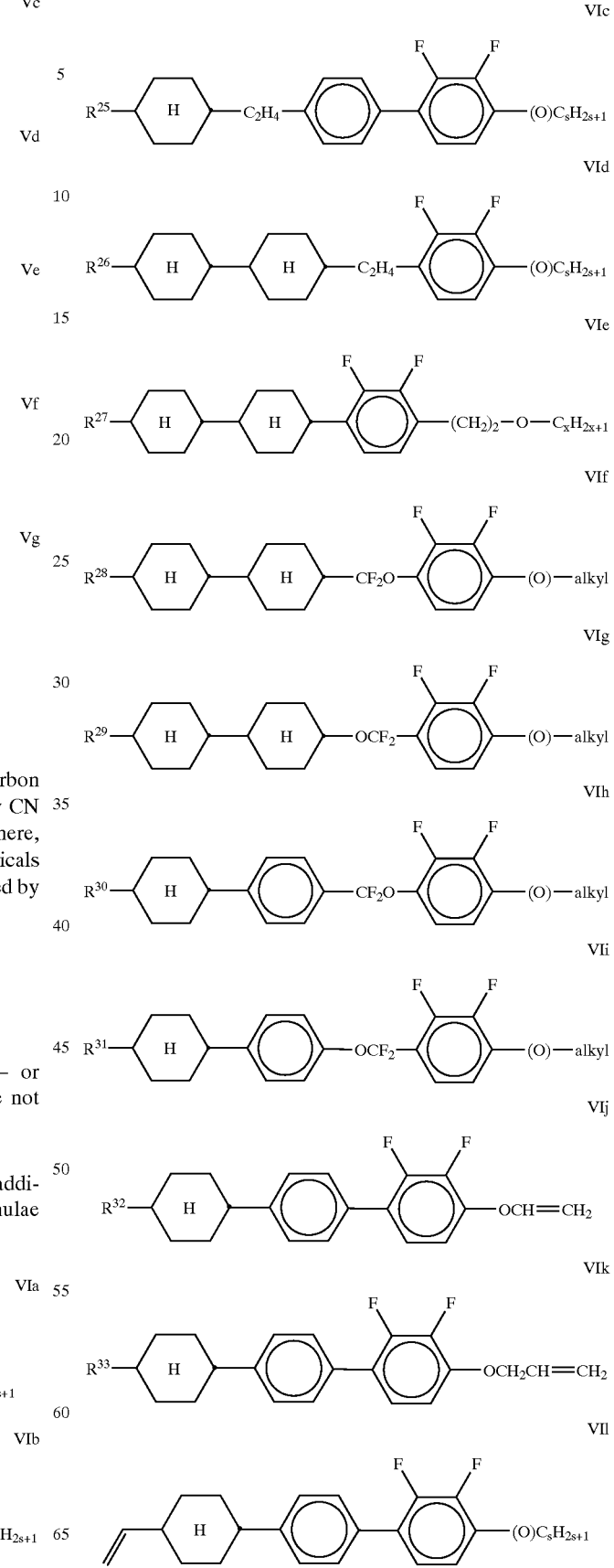

in which

R[15] is an alkyl or alkenyl radical having up to 15 carbon atoms which is unsubstituted, monosubstituted by CN or CF3 or at least monosubstituted by halogen, where, in addition, one or more $CH_2$ groups in these radicals may each, independently of one another, be replaced by —O—, —S—,

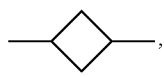

—C≡C—, —CO—, —CO—O—, —O—CO— or —O—CO—O— in such a way that 0 atoms are not linked directly to one another, $R^E$ is H, $CH_3$, —$C_2H_5$ or n-$C_3H_7$—.

10. Liquid-crystalline medium according to claim 1, additionally comprising one or more compounds of formulae VIa to VIo:

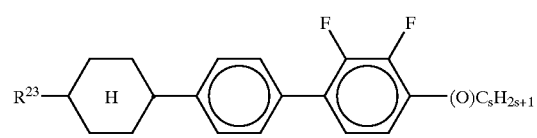

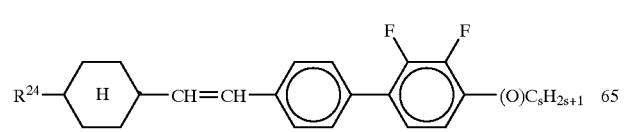

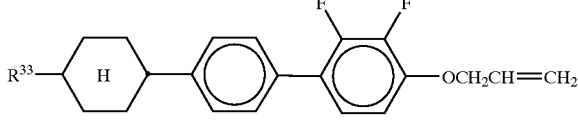

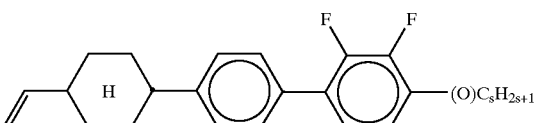

-continued

VIm

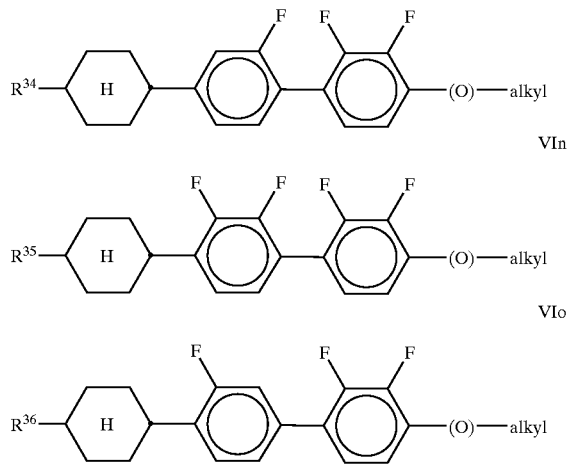

VIn

VIo in which $R^{23}$ to $R^{36}$ are an alkyl or alkenyl radical having up to 15 carbon atoms which is unsubstituted, monosubstituted by CN or —CF$_3$— or at least monosubstituted by halogen, where, in addition, one or more CH$_2$ groups in these radicals may each, independently of one another, be replaced by —O—, —S—, —C≡C—, —CO—, —CO—O—, —O—CO— or —O—CO—O— in such a way that 0 atoms are not linked directly to one another, and s is from 1 to 6.

11. Liquid-crystalline medium according to claim 1, consisting essentially of 3–25% by weight of one or more compounds of the formula I, 20–70% by weight of one or more compounds of formula II,

II

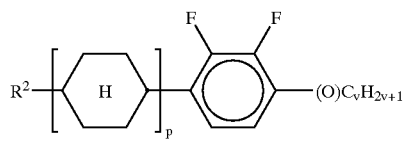

in which
R$^2$ is as defined for R$^{11}$ and R$^{12}$,
p is 1 or 2, and
v is from 1 to 6
up to 20% by weight of one or more compounds of formula III, and
5 to 40% by weight of one or more compounds of formula IV

IV

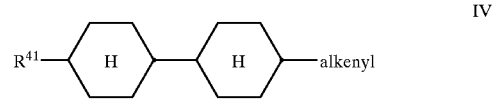

in which
R$^{41}$ is an alkyl or alkenyl having up to 15 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—, —C≡C—, —CO—, —CO—O—, —O—CO— or —O—CO—O— in such a way that 0 atoms are not linked directly to one another.

12. Electro-optical display with active matrix addressing based on the ECB effect, containing, as dielectric, a liquid crystalline medium according to claim 1.

13. Electro-optical display for IPS applications, containing, as dielectric, a liquid-crystalline medium according to claim 1.

* * * * *